(12) United States Patent
Yanagihara

(10) Patent No.: US 8,023,961 B2
(45) Date of Patent: Sep. 20, 2011

(54) METHOD AND A SYSTEM FOR LOCATION ESTIMATION USING LOCATION ESTIMATED

(75) Inventor: Kentarou Yanagihara, Hyogo (JP)

(73) Assignee: Oki Electric Industry Co. Ltd., Tokyo (JP)

( * ) Notice: Subject to any disclaimer, the term of this patent is extended or adjusted under 35 U.S.C. 154(b) by 1095 days.

(21) Appl. No.: 11/704,948

(22) Filed: Feb. 12, 2007

(65) Prior Publication Data

US 2007/0191022 A1    Aug. 16, 2007

(30) Foreign Application Priority Data

Feb. 14, 2006    (JP) .................................. 2006-036608

(51) Int. Cl.
*H04W 24/00*    (2009.01)
(52) U.S. Cl. ............... 455/456.1; 455/404.2; 455/414.2; 455/456.2; 455/456.3; 455/456.5
(58) Field of Classification Search .................. 455/456, 455/457, 404.2, 414.1–414.4, 456.1–456.6
See application file for complete search history.

(56) References Cited

U.S. PATENT DOCUMENTS

| | | | | |
|---|---|---|---|---|
| 6,166,685 | A * | 12/2000 | Soliman ..................... | 342/357.1 |
| 6,275,186 | B1 * | 8/2001 | Kong ............................ | 342/363 |
| 6,347,228 | B1 * | 2/2002 | Ludden et al. ............. | 455/456.5 |
| 6,473,038 | B2 * | 10/2002 | Patwari et al. ............... | 342/450 |
| 2001/0003443 | A1 * | 6/2001 | Velazquez et al. ........... | 342/367 |
| 2004/0002346 | A1 * | 1/2004 | Santhoff .................... | 455/456.1 |
| 2004/0087317 | A1 * | 5/2004 | Caci .......................... | 455/456.1 |

FOREIGN PATENT DOCUMENTS

JP    2006003187 A    1/2006

OTHER PUBLICATIONS

In N. Sundaram and P. Ramanathan, "Connectivity Based Location Estimation Scheme for Wireless Ad Hoc Networks", IEEE Globecom 2002, pp. 143-147.
Kentaro Yanagihara, et al., "A Maximum Likelihood Estimation Method of Localization using RSSI in Wireless Sensor Networks", Technical report of IEICE, the Institute of Electronics, Information and Communication Engineers, IN2004-327. pp. 409-414.

* cited by examiner

*Primary Examiner* — Jinsong Hu
*Assistant Examiner* — Dung Hong
(74) *Attorney, Agent, or Firm* — Rabin & Berdo, P.C.

(57) ABSTRACT

In a system for location estimation, information necessary for location estimation is acquired from a wireless signal. The first estimated location of each of target terminals is found out on the basis of the acquired information necessary for location estimation, and the locations of reference terminals. The second estimated location of each target terminal is found out on the basis of the information necessary for location estimation, the first estimated locations of the target terminals other than that target terminal of which the location estimation is being carried out, and on the locations of the reference terminals. Thus, the system for location estimation avoids the problem associated with an increased sphere of location estimation and with an increased communication traffic attendant on an increased number of target terminals, and achieves location estimation of high accuracy.

7 Claims, 6 Drawing Sheets

METHOD AND A SYSTEM FOR LOCATION ESTIMATION USING LOCATION ESTIMATED

BACKGROUND OF THE INVENTION

1. Field of the Invention

The present invention relates to a system for estimating the location of a wireless terminal on the basis of received wireless signals. More particularly, the present invention relates to such a system for high accuracy location estimation.

2. Description of the Background Art

A conventional system for location estimation includes a wireless terminal, the location of which is to be estimated, i.e. a target terminal, and three or more wireless terminals, the locations of which are known from the outset, i.e. reference terminals, which are adapted to transmit packets to respective neighboring terminals. The packets include identification codes proper to the respective terminals. On receipt of the packets, the respective terminals determine that the transmitting terminals stay within the range of possible signal delivery, and accordingly add the transmitting terminals to a list of neighboring terminals they have. When the transmissions between the totality of the terminals have come to an end, the lists of neighboring terminals are collected from those terminals to a location estimation device (sink terminal) and stored in the latter. The location estimation device progressively uses the obtained relationship of interconnection of the terminals and the locations of the reference terminals to narrow down the sphere of possible presence of the target terminals. More specifically, the system for location estimation deems that the distance between terminals, between which a packet has been transmitted with success, is less than the distance which allows for signal delivery, while deeming that the distance between terminals, between which a packet has not been transmitted with success, is not less than the distance which allows for signal delivery. The system for location estimation accordingly determines the distance between terminals in two stages, that is, a distance longer than the range of possible signal transmission and a distance not longer than the range of possible signal transmission, in order to effect location estimation. This is disclosed, for example, in N. Sundaram and P. Ramanathan, "Connectivity Based Location Estimation Scheme for Wireless Ad Hoc Networks", IEEE Globecom 2002, pp. 143-147.

It is also known to model the relationship between the distance between the terminals with the power of received signals with the fading occurring on a wireless transmission path taken into account, and to estimate the location of a target terminal from the location of a plural number of reference terminals and an estimated distance between the target terminal and the reference terminals. It is likewise known to effect signal reception a number of times to diminish the effect of fading to improve the accuracy in location estimation. Those are disclosed, for example, in U.S. Pat. No. 6,473,038 to Patwari, et al., and Kentaro Yanagihara, et al., "A Maximum Likelihood Estimation Method of Localization using RSSI in Wireless Sensor Networks", Technical report of IEICE, the Institute of Electronics, Information and Communication Engineers, IN2004-327. pp. 409-414.

However, with the conventional system for location estimation, if an area as the subject of location estimation becomes larger, then the more reference terminals have to be disposed. Moreover, if location estimation is to be improved in accuracy, it is necessary to install the reference terminals at a higher density to gather as much information as possible at the location estimation device. If the number of the target terminals is increased, the traffic of communication for location estimation is also increased. The amount of the information to be gathered is proportional to the product of the density of the reference terminals and the number of the target terminals. If the traffic of the communication for location estimation is increased, there is a possibility that the communication is deteriorated in quality. Hence, there is raised a demand for a system for location estimation may be moderated in which the problem associated with an increased communication traffic accompanying an increased sphere for location estimation and an increased number of target terminals, and at the same time high precision location estimation may be assured.

In addition, with the conventional system for location estimation, it is presupposed that the target terminals are immovable, so that, if target terminals are moving, location estimation accuracy may be lowered. Hence, there is raised a demand for a high precision system for location estimation capable of coping with a movable target terminal as a subject of location estimation.

SUMMARY OF THE INVENTION

It is an object of the present invention to provide a system for estimating the location of a wireless terminal according to which location estimation may be improved in accuracy.

In accordance with the present invention, there is provided a method for estimating a location of a target terminal, wherein a plurality of target terminals and a plurality of reference terminals transmit and receive a wireless signal to and from each other to estimate the location of the target terminal on the basis of the wireless signal and the location of the plurality of reference terminals, each of the plurality of reference terminals being arranged at a known location. The method comprises the steps of: acquiring information necessary for location estimation from the wireless signal; finding out a first estimated location of each of the plurality of target terminals on the basis of the acquired information necessary for location estimation, and on the location of the plurality of reference terminals; and finding out a second estimated location of each of the plurality of target terminals on the basis of the information necessary for location estimation, acquired from the wireless signal, the first estimated location of ones of the plurality of target terminals other than the target terminal of which the estimated location is being found out, and the location of the plurality of reference terminals.

The target terminal may include a movement detector for detecting the movement of the target terminal itself. The information pertinent to the movement of the target terminal itself is included in the location estimation information signal. Each time the location estimation information signal is received, the location estimator stores the information contained in the signal. The movement detector selects the information stored on the basis of the information pertinent to the movement of the target terminal in question, and uses the selected information to find out the second estimated location of the target terminal in question.

According to the present invention, the information necessary for location estimation is acquired from the wireless signals. A first estimated location of each of a plural number of target terminals is found out from the acquired information necessary for location estimation and from the locations of the reference terminals. A second estimated location of each of the target terminals is then found out on the basis of the information necessary for location estimation acquired from the wireless signal, the first estimated locations of the target terminals other than the target terminal of which the location is to be estimated, and the locations of the reference terminals.

This improves accuracy in location estimation of target terminals without increasing the number of the reference terminals.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
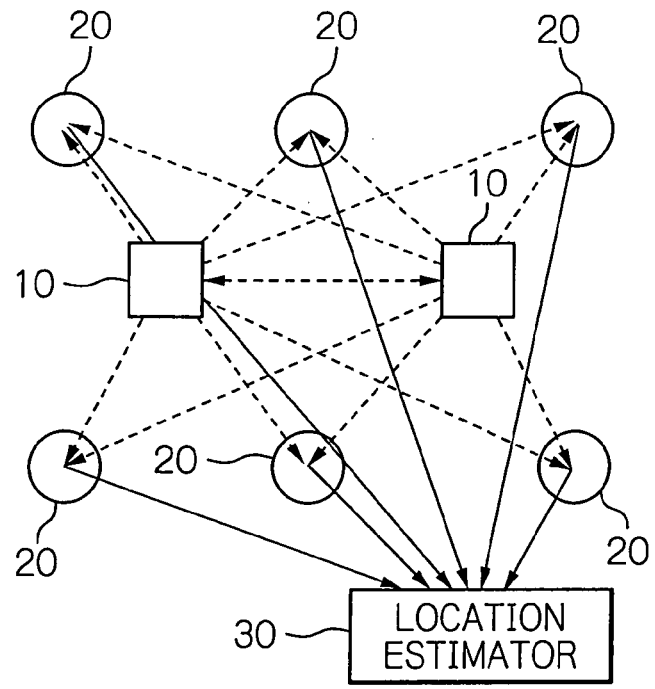
FIG. 1 is a schematic diagram showing the constitution of an embodiment of a system for location estimation according to the present invention.

With reference to FIG. 1, showing a preferred embodiment of a system for location estimation according to the present invention, there are provided a plural number of target terminals 10, the locations of which are to be estimated. Each target terminal 10 transmits a location estimation request signal. Each target terminal 10 also measures a received power of a location estimation request signal transmitted from each of the other target terminals 10, and transmits the information on measured values to a location estimator 30 as the information necessary for location estimation. There are provided a plural number of reference terminals 20, the locations of which are known from the outset. These reference terminals 20 measure the received power of the location estimation request signals transmitted from the target terminals 10, and transmit the information on the measured values, as the information necessary for location estimation, to the location estimator 30. The location estimator 30 estimates the locations of the target terminals 10 on the basis of the received power values transmitted from the reference terminals 20 as the information necessary for location estimation. In the figure, dotted lines indicate transmissions to the totality of peripheral terminals and solid lines denote transmissions to specific ones of the terminals indicated by corresponding arrows.

Figure 2:
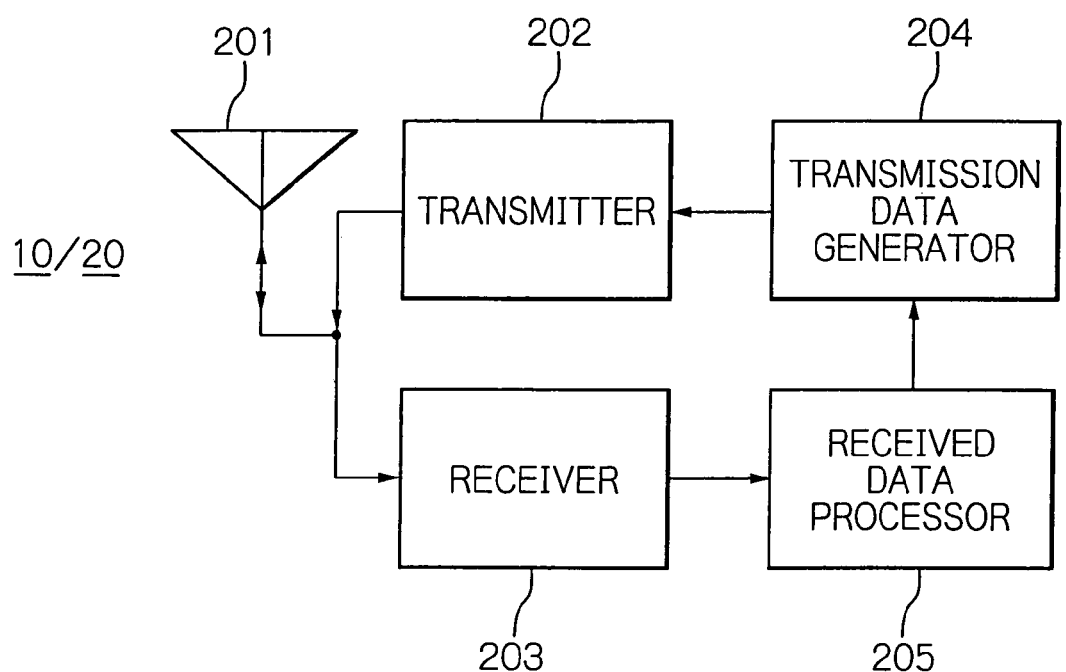
FIG. 2 is a schematic block diagram for illustrating a target terminal and a reference terminal in the system shown in FIG. 1.

FIG. 2 depicts the constitution of the target terminal 10 and the reference terminal 20 in the embodiment where the target terminal 10 is the same in constitution as the reference terminal 20. In FIG. 2, the target terminal 10 and the reference terminal 20 are made up by an antenna 201, a transmitter 202, a receiver 203, a transmission data generator 204, and a received data processor 205, which are interconnected as illustrated. The antenna 201 is used for transmitting and receiving a radio signal. The receiver 203 is adapted to receive a radio signal captured by the antenna 201, and convert the radio signal into the corresponding digital information which is then output in the form of received data to the received data processor 205. The receiver 203 also functions as measuring the received power of the received input signals to output the information on the measured values to the received data processor 205.

The received data processor 205 serves as processing the received data entered from the receiver 203 so that, in case the received data is a location estimation request signal transmitted from the target terminal 10, the processor 205 instructs the transmission data generator 204 to formulate transmission data including the information on the received power value measured by the receiver 203 and a code of a transmitting terminal included in the location estimation request signal. The transmission data generator 204 is adapted for producing, under the command from the received data processor 205, a location estimation information signal including the received power value input from the received data processor 205, the code for the transmitting terminal and an identification code specifically allotted to that terminal as a relay terminal code. The transmission data generator 204 also produces, at a timing when location estimation is required, a location estimation request signal, having included the identification code, as a transmitting terminal code, and outputs the produced location estimation request signal to the transmitter 202. The transmitter 202 converts the location estimation request signal or the location estimation information signal produced in the transmission data generator 204, into a corresponding radio signal to output the resulting signal over the antenna 201.

Figure 3:
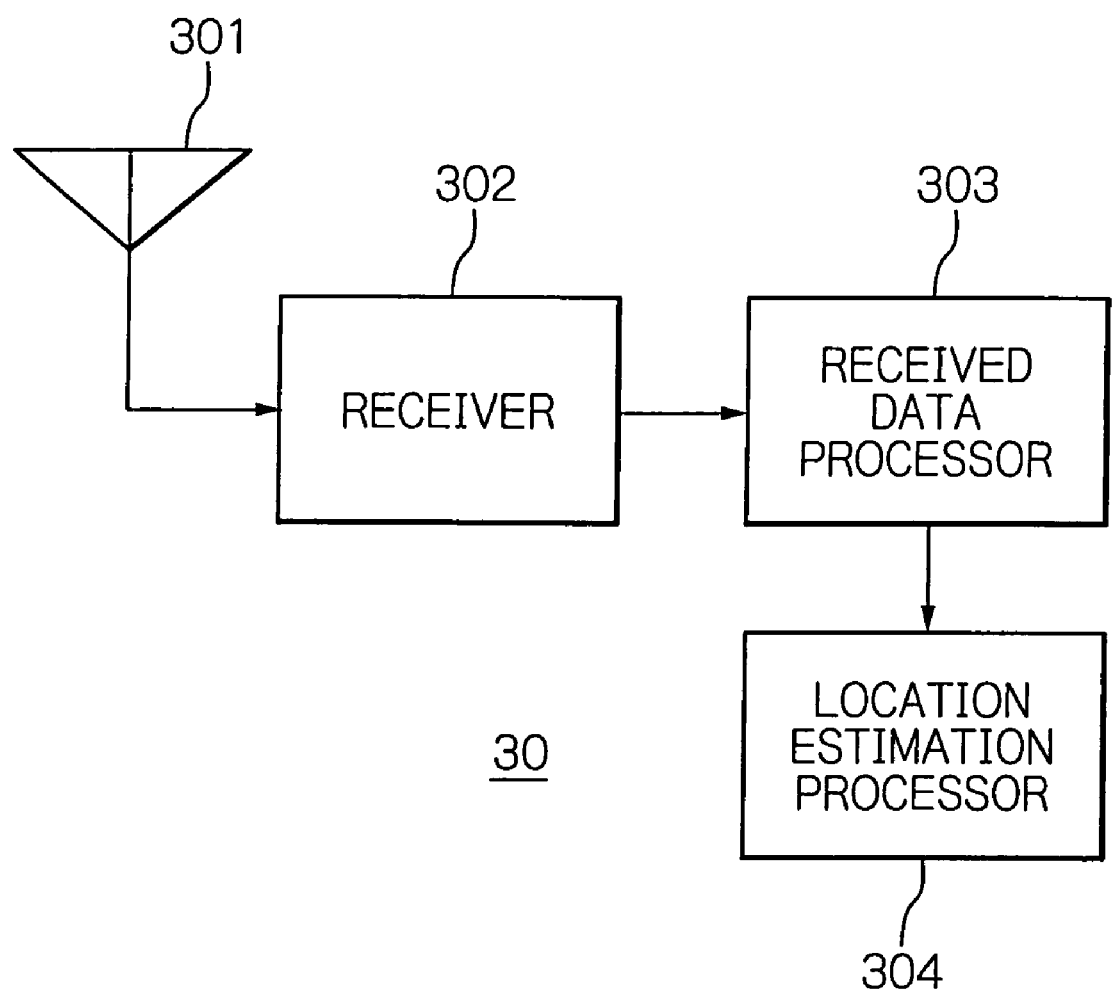
FIG. 3 is a schematic block diagram for illustrating a location estimator in the system.

FIG. 3 shows the constitution of the location estimator 30 of the embodiment. In FIG. 3, the location estimator 30 is made up of an antenna 301, a receiver 302, a received data processor 303 and a location estimation processor 304, which are interconnected as shown. The antenna 301 is used for transmitting and receiving a radio signal. The receiver 302 is adapted for receiving the radio signal captured by the antenna 201, and converting the radio signal into the digital information which then is output in the form of received data to the received data processor 303. The received data processor 303 functions as processing the received data supplied from the receiver 302. In case the received data is the location estimation information signal transmitted from the target terminal 10 or the reference terminal 20, the received data processor 303 outputs the information contained in the location estimation information signal to the location estimation processor 304. The location estimation processor 304 is adapted to estimate the location of the target terminal 10 by an operation which will be described later, on the basis of the information contained in a plural number of location estimation information signals transmitted from the received data processor 303. Meanwhile, the antenna 301, the receiver 302 and the received data processor 303 used may be similar in constitution to the corresponding circuits of the target terminal 10, while only the location estimation processor 304 may be a device unique to the location estimator 30, and the received data processor 303 may be connected via communication route with the location estimation processor 304.

The operation of the embodiment constructed as described above will now be described in detail. Initially, one of the target terminals 10 which is a subject of location estimation transmits a location estimation request signal, containing an identification code proper to the target terminal 10, as a transmitting terminal code, to the totality of the peripheral terminals. The remaining ones of the target terminal 10 which has transmitted the above location estimation request signal, and the reference terminals 20, measure the received power values of the received location estimation request signals, and transmit location estimation information signals containing the information on the received power values, the transmitting terminal code and the identification code proper to the terminals exclusive of the original transmitting terminal, as the relay terminal codes, to the location estimator 30. The location estimator 30 saves the information contained in the location estimation information signals received from the target terminals 10 excluding the original transmitting target terminal, and from the respective reference terminals 20, and estimates the location of the original transmitting target terminal 10 on the basis of the saved information.

Figure 4:
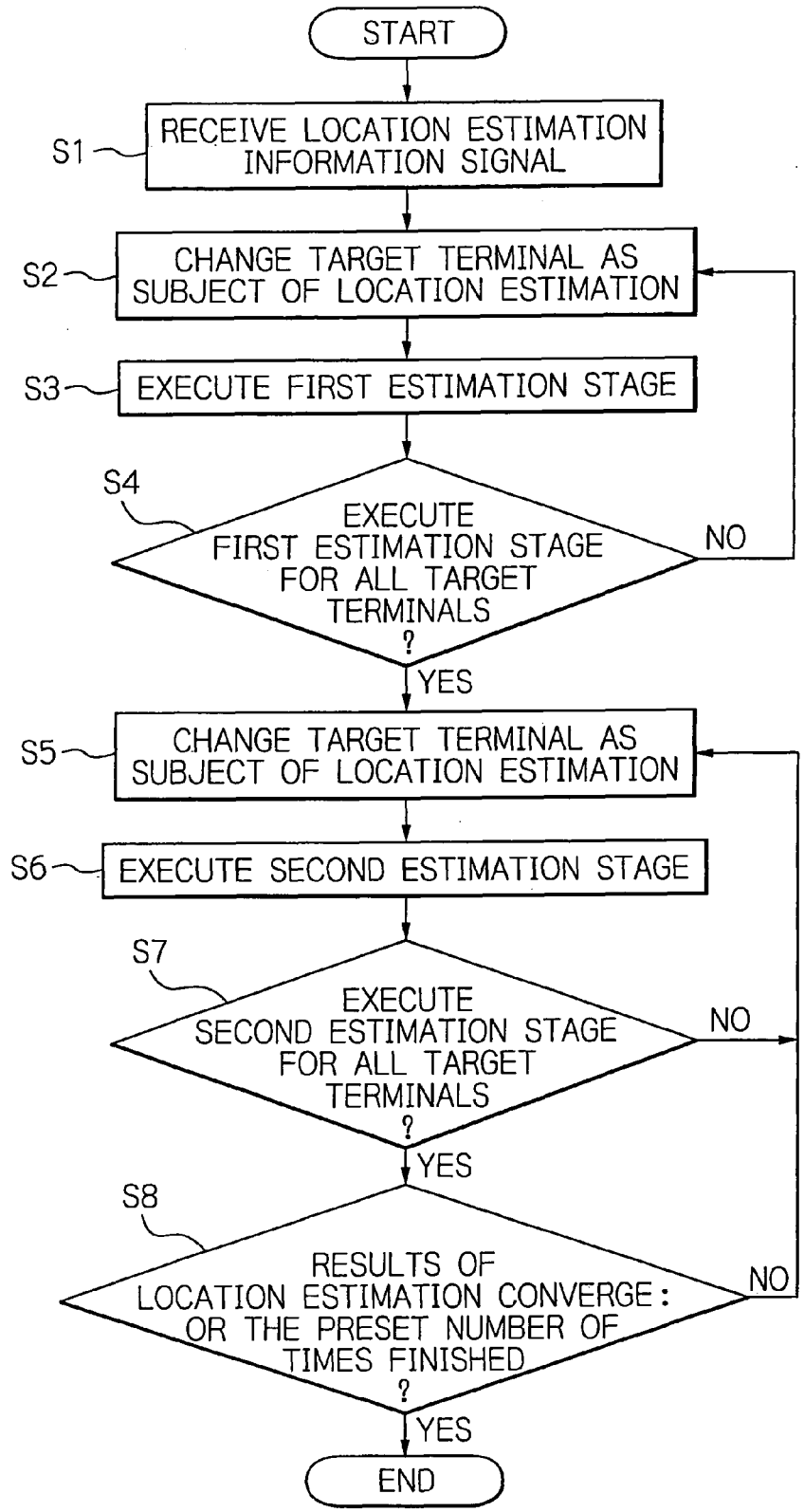
FIG. 4 is a flowchart useful for understanding the operation of location estimation by the location estimator in the system.

The operation of the location estimation by the location estimator 30 will now be described with reference to FIG. 4. FIG. 4 is a flowchart showing the location estimation operation of the location estimator of the illustrative embodiment. The location estimator 30 receives the location estimation information signals to initiate location estimation (step S1). The location estimator executes a first estimation stage of finding out first estimated locations of the totality of the target terminals 10 specified by the transmitting terminal codes of the received location estimation information signals (steps S2 and S3). The first estimation stage finds out the estimated location of the original transmitting target terminal 10 on the basis of the information on the values of the received power contained in the location estimation information signals which also contain the transmitting terminal code of the target terminal 10 whose estimated location is to be found out, and in which the relay terminal codes specify the reference terminals 20, and on the basis of the locations of the reference terminals 20. In finding out the estimated location, the presence probability of the target terminal 10 in question at each point where the target terminal 10 in question is thought to be present is calculated from the information transmitted between each reference terminal 20 and the target terminal 10 in question, and from the location of each reference terminal 20.

Then, using a mathematical method, such as most likelihood method, the point with the highest presence probability of the target terminal 10 in question is searched for and the point thus found is adopted as the estimated location for the target terminal 10 in question. Alternatively, a table defining the relationship between received power values and distances is referenced and, from this table, the distance between each of the plural reference terminals 20, the locations of which are known from the outset, and the target terminal 10 in question, is obtained to determine the estimated location. Meanwhile, the method for obtaining the estimated location is not limited to the above, but any other suitable method may be used in order to find out the estimated location. The above-described first estimation stage is carried out for all of the target terminals 10 the locations of which are to be estimated (steps S2 to S4).

A second estimation stage of finding out the second estimated locations of the target terminals 10 is then carried out on the basis of the first estimated locations of the target terminals 10 which locations were found out in the first estimation stage (step S3), the location estimation information signals received from the target terminals 10 and the reference terminals 20, and the locations of the reference terminals 20. In the second estimation stage, the estimated location of the target terminal 10, the estimated location of which is to be found out, is determined on the basis of the information on the received power value carried on the location estimation information signal containing the transmitting terminal code of the target terminal 10 in question, the locations of the reference terminals 20 and the first estimated locations of the target terminals 10 other than the target terminal 10 in question. The estimated location may be found out by a method similar to the method used in the first estimation stage. The second estimation stage (step S6) is carried out for all of the target terminals 10 the locations of which are to be estimated (steps S5 to S7). The second estimated locations thus found out suffer from the estimation error to a lesser extent than the first estimated locations because the information is now used which was transmitted between the target terminals 10.

By execution of the second estimation stage, the estimated location of the target terminal 10 is changed from the first estimated location to the second estimated location. Since the estimated location of one target terminal 10 is used for location estimation of the other target terminals 10, a change in the estimated location of one of the target terminals 10 affects location estimation of the other peripheral target terminals 10. Thus, if the estimated location of one target terminal 10 is changed, location estimation of the other target terminals 10 is carried out again. Specifically, the second estimated location is used as the first estimated location, and the second estimation stage is iteratively carried out for the target terminals 10 other than the target terminal 10 in question (steps S5 to S8). Decision as to whether or not the second estimation stage is to be continued further is given on the basis of convergence of the results of location estimation for the totality of the target terminals, or on the basis of constraints, such as a calculation period of time.

Meanwhile, there is a probability that, in the course of iterative execution of the second estimation stage (steps S5 to S8), the results of location estimation do not converge due to interaction of the updated estimated locations, depending on the location relationships of the target terminals 10. For example, if the target terminal 10 has received only signals from three reference terminals 20 arranged on the same straight line, the estimated locations are two points symmetrically positioned with respect to that line passing those three reference terminals 20. If two target terminals 10, which have received only two signals from reference terminals 20 due to e.g. collision of location estimation information signals, are located at equidistant positions from the two reference terminals 20, the estimated locations of those two target terminals 10 are two estimated points positioned at the intersections of arcs having the centers thereof located at the reference terminals 20. In such a case, the second estimation stage carried out iteratively could possibly cause the processor 304 to alternately estimate two estimated locations as the locations of the target terminals 10, so that convergence of location estimation would not be achieved.

Hence, with the illustrative embodiment, the location estimation processor 304 has the function of comparing the estimated location obtained at the time of updating the estimated location to past estimated locations to correct the estimated location depending on the results of comparison. For example, if the distance between the first and second estimated locations of a target terminal is equal to or greater than a predetermined value, an optional location between the first and second estimated locations is adopted as the second estimated location. In a method for the determination of the optional location, the likelihood of the first and second estimated locations may be used.

For example, in case the post-update estimated location differs appreciably from the pre-update estimated location, a position on a line interconnecting the pre-update estimated location and the post-update estimated location is adopted as the post-update estimated location. Also for example, if the location estimation processor 304 has kept records of the past estimated location, and such a recorded past estimated location is the same as the post-update estimated location, processing is discontinued.

In estimating the location of the target terminal 10 in the first estimation stage, if the location estimator 30 possesses the information representing the coincidence of the relay terminal code with the identification code of another target terminal 10, the location estimation for which has already been finished, such other target terminal 10 may be deemed to be the reference terminal 20 and used for location estimation of the target terminal 10.

If the target terminal 10 moves on a small distance, the data transmitted and received in the past may be used during the first and second estimation stages. By doing so, it is possible to exclude the effect from instantaneous variations of the received power due to, e.g., fading.

By transmitting the information, which the target terminal 10 has received from the other target terminals 10, to the location estimator 30, as described above, it is possible to accomplish location estimation to higher accuracy even under such a condition that the number of the reference terminals 20 is small, and to prevent the quantity of communication from increasing excessively. In addition, location estimation of higher accuracy may be attained by iteratively carrying out location estimation with the use of the results of location estimation of peripheral target terminals 10.

In the above-described embodiment, location estimation is carried out by the location estimator 30. In an alternative embodiment of the present invention, which will be described later, the function of the location estimator is enclosed in each target terminal 10, so that location estimation of the target terminals 10 may be executed only by target terminals 10 and reference terminals 20.

Figure 5:
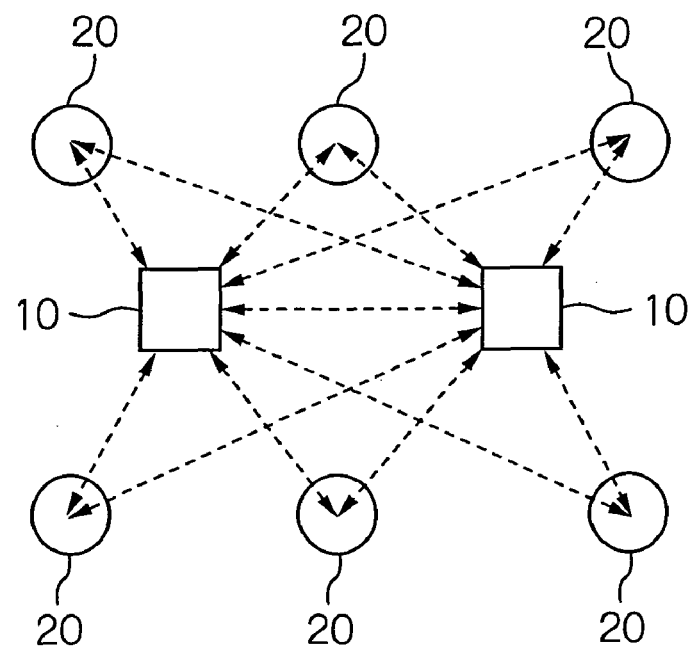
FIG. 5 is a schematic diagram showing the constitution of an alternative embodiment of a system for location estimation according to the present invention.

Referring to FIG. 5 showing the constitution of a system for location estimation in the alternative embodiment, a plural number of target terminals 10 which are the subjects of location estimation are arranged, and adapted to transmit and receive location estimation information signals. Each of the target terminal 10 estimates its location on the basis of the location estimation information signals transmitted from the reference terminals 20 or from the remaining target terminals 10. There are provided a plural number of the reference terminals 20, with the locations of these reference terminals 20 being known from the outset. These reference terminals 20 periodically transmit location estimation information signals. Dotted lines in the figure denote communication directed to the totality of the peripheral terminals.

Figure 6:
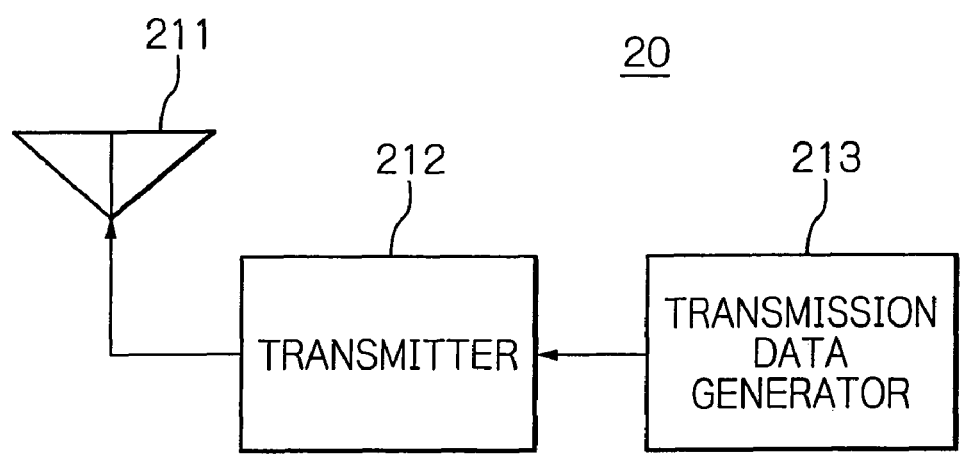
FIGS. 6 and 7 are schematic diagrams showing a reference terminal and a target terminal in the system of FIG. 5, respectively.

FIG. 6 depicts the reference terminal 20 in the alternative embodiment. In the figure, the reference terminal 20 is made up of an antenna 211, a transmitter 212 and a transmission data generator 213, which are interconnected as illustrated. The antenna 211 sends out a radio signal. The transmission data generator 213 is adapted to produce a location estimation information signal inclusive of an identification code specifically assigned to the reference terminal 20. The transmitter 212 is adapted for converting the location estimation information signal produced by the transmission data generator 213 to a corresponding radio signal which is in turn output to the antenna 211.

Figure 7:
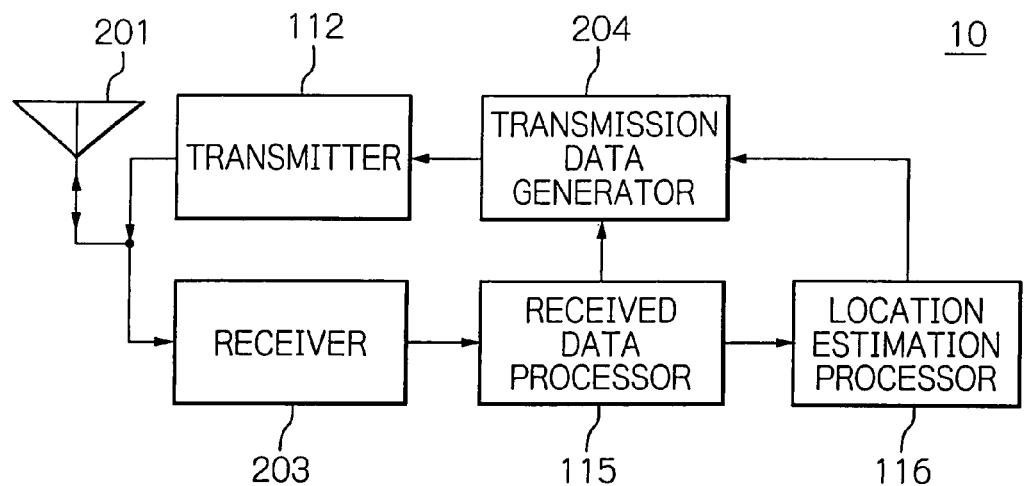

FIG. 7 shows the target terminal 10 in the alternative embodiment. In the figure, the target terminal 10 is made up of a transmitter 112, a received data processor 115 and a location estimation processor 116 in addition to the antenna 201, the receiver 203 and the transmission data generator 204 which are already described with reference to FIG. 2. Description on the latter will therefore not be repeated. In the descriptive portion of the application, like components are designated with the same reference numerals.

The received data processor 115 functions as processing received data transmitted from the receiver 203 such that, if the received data is of the location estimation information signal sent from the target terminal 10 or the reference terminal 20, the data processor 115 outputs the information contained in the location estimation information signal and the information on the received power signal measured to the location estimation processor 116. The location estimation processor 116 estimates the location of the target terminal 10 in question, by an operation which will be described later, on the basis of the information contained in the plural location estimation information signals transmitted from the received data processor 115. The location estimator 204 outputs the information on the estimated location to the transmission data generator 204. The transmission data generator 204 produces the location estimation information signal inclusive of the estimated location of the target terminal 10 in question transmitted from the location estimation processor 116, and an identification code proper to the target terminal. The data generator 204 outputs the produced location estimation information signal to the transmitter 112. The transmitter 112 converts the location estimation information signal produced in the transmission data generator 204 to a radio signal, which is then output to the antenna 201.

Figure 8:
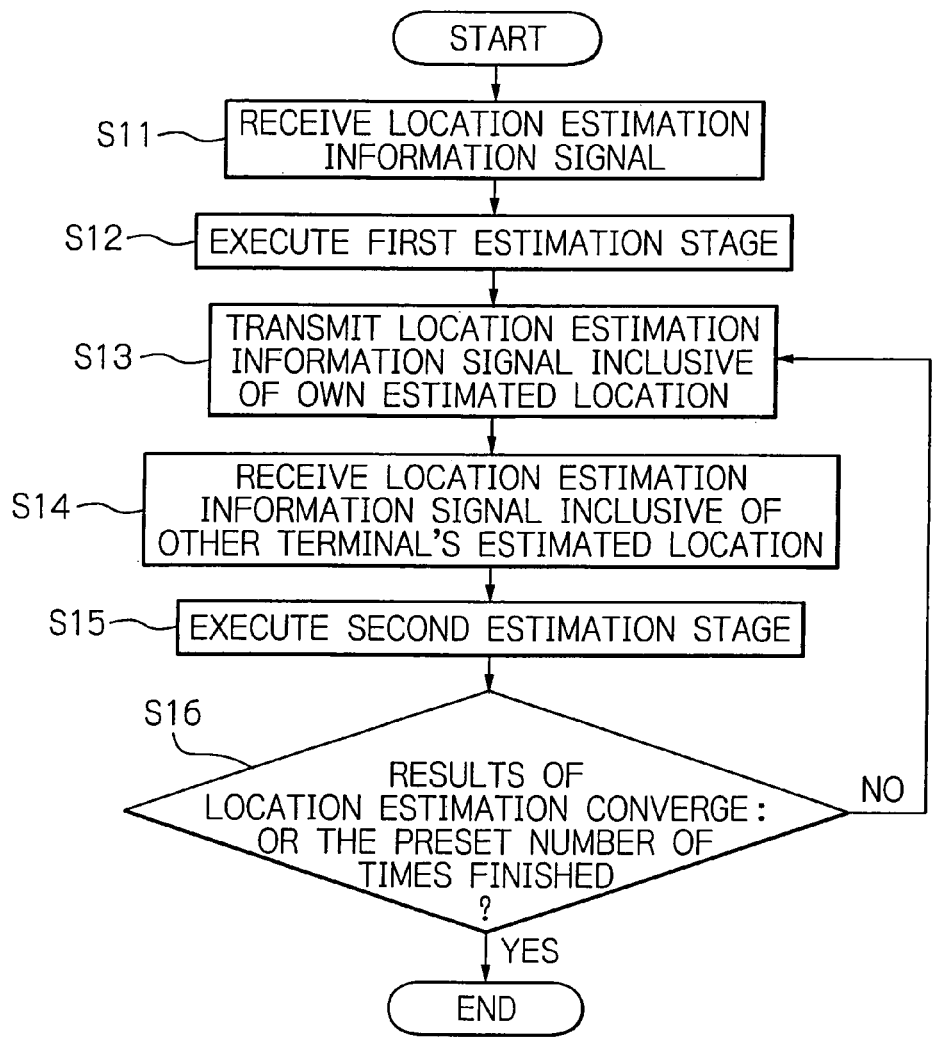
FIG. 8 is a flowchart useful for understanding the operation of location estimation by the location estimator in the system of FIG. 5.

The operation of the above-described alternative embodiment will now be described with reference to FIG. 8. FIG. 8 is a flowchart for illustrating the operation of location estimation for the target terminal 10 of the alternative embodiment. Initially, each reference terminal 20 transmits a location estimation information signal inclusive of an identification code proper to that reference terminal 20. The target terminal 10 receives the location estimation information signal transmitted from each reference terminal 20 (step S11), and measures the received power value of the location estimation information signal thus received. The target terminal then executes a first estimation stage of finding out the first estimated location of the target terminal 10 itself on the basis of the information on the received power values and the location of the reference terminal 20 (step S12). The estimated location is acquired by an operation similar to the operation of the illustrative embodiment shown in FIG. 1. The estimated location may also be acquired by appropriate methods other than that described above. The target terminal 10 then transmits the location estimation information signal, inclusive of the information on the first estimated location of the target terminal 10 and an identification code proper to that target terminal 10 (step S13).

The target terminal 10 receives the location estimation information signals transmitted from other target terminals 10 (step S14). The target terminal 10 then measures the received power values of the location estimation information signal received, and executes a second estimation stage of finding out a second estimated location of the target terminal 10 itself on the basis of the information on the received power values, the first estimated locations of the other target terminals 10 included in the location estimations signals, the information on received power values acquired from the location estimation information signals received from the reference terminals 20, and the locations of the reference terminals 20 (step S15). The estimated location is found out by a method similar to one used in the above-described first estimation stage. The second estimated location, thus found, suffers from the estimation error to a lesser extent than the first estimated locations, because the information transmitted and received between the target terminals 10 is now used.

By the second estimation stage thus executed (step S15), the estimated location of the target terminal 10 is changed from the first estimated location to the second estimated location. Since the estimated location of the target terminal 10 is used for location estimation of the remaining target terminals 10, any change in the estimated location of the target terminal 10 would affect location estimation of the other peripheral target terminals 10. With the alternative embodiment, however, if the estimated location of a target terminal 10 is changed, location estimation of the other target terminals 10 is carried out again. More specifically, the location estimation information signal inclusive of the second estimated location of the target terminal 10 in question is transmitted. Then, in case the location estimation information signals inclusive of the second estimated locations are received from the remaining target terminals 10, the sequence of operations of steps S13 to S15 is iteratively carried out with the second estimated locations of the other target terminals 10 taken as the first estimated locations thereof (step S16). Decision as to whether or not iteration of the second estimation stage is to be continued further is given depending on convergence or non-convergence of the results of location estimation for all of the target terminals, or on the basis of constraints, such as calculation time period (step S16).

In the instant alternative embodiment, like the embodiment shown in and described with reference to FIG. 1, there would otherwise be a probability that, in the course of iterative calculations, the results of location estimation do not converge due to interaction of the updated estimated locations, depending on the location relationships of the terminals. However, the location estimation processor 116 has the function of comparing the estimated location obtained at the time of updating the estimated location to past estimated locations to correct the estimated location depending on the results of comparison.

It is noted that the location relationships of the target terminal 10 with the reference terminal 20 may be measured more correctly if, in the course of iterative execution of the operations of the second estimation stage, the reference terminals 20 periodically transmit location estimation information signals, and the target terminal 10 transmits and receives signals a plural number of times to and from the same reference terminals 20. If the location relationship between the target terminal 10 and the reference terminals 20 is updated at the same time as the estimated location of the target terminal 10 is updated in the second estimation stage, it is possible to improve the accuracy in location estimation.

By transmitting the results of location estimation of the target terminal 10 to the peripheral target terminals 10 in order for these peripheral target terminals to exploit the so transmitted results of location estimation, location estimation may be achieved to higher accuracy even in a state that the number of the reference terminals 20 is small. The target terminal 10 thus adapted for carrying out the location estimation processing allows the communication between the reference terminal 20 and the location estimator 30 to be dispensed with, thus further reducing the communication traffic dedicated for location estimation.

In a further alternative embodiment of the present invention, which will be described below, a movement detection function is added to the target terminal 10 in addition to the function of the embodiment of FIG. 1, and the information on the terminal movement is used for location estimation. In the further alternative embodiment, the constitution of the system for location estimation may be the same, and the reference terminals 20 and the location estimator 30 may be similar to those in the embodiment shown in FIG. 1.

Figure 9:
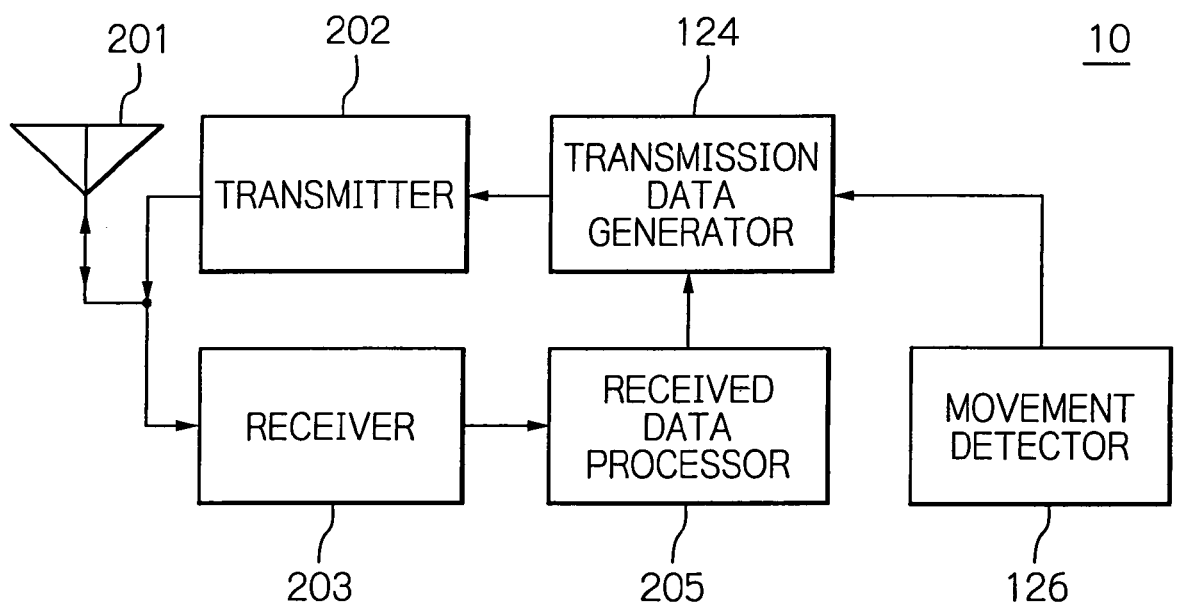
FIG. 9 is a schematic diagram showing a further alternative embodiment of a target terminal according to the present invention.

Referring to FIG. 9, which shows the constitution of the target terminal 10 in the further alternative embodiment, the target terminal 10 is comprised of a transmission data generator 124 and a movement detector 126 as well as the antenna 201, the transmitter 202, the receiver 203 and the received data processor 205, which are interconnected as shown. The latter components are already described, and therefore a repetitive description thereon will be avoided.

The movement detector 126 has a sensor element such as an acceleration sensor, not shown, for sensing the movement of the terminal 10 which it carries thereon, to output information on the movement thus sensed to the transmission data generator 124. The transmission data generator 124 operates in response to instructions from the received data processor 205 to produce the location estimation information signal including the information on terminal movement transferred from the movement detector 126, the information on the received power value and the transmitting terminal code transferred from the received data processor 205, and the identification code proper to the target terminal 10 as the relay terminal code. The transmission data generator 124 also produces, at a timing when location estimation is required, a location estimation request signal, having included an identification code proper to the target terminal 10 as a transmitting terminal code, to output the produced location estimation request signal to the transmitter 202.

The operation of the embodiment of FIG. 9 will now be described in detail. Initially, the target terminal 10 in question transmits the information on the movement of the target terminal itself, detected by the movement detector 126, and the location estimation information signal including the identification code proper to the target terminal 10 in question, as a transmitting terminal code, to the totality of the peripheral terminals. The target terminals 10 other than the target terminal 10 which has transmitted the location estimation request signal, and the reference terminals 20 measure the received power value of the location estimation request signal received. The terminals 10 and 20 then transmit to the location estimator 30 the location estimation information signal containing the information on the received power value, the information on the movement of the target terminal 10, the transmitting terminal code, and the identification code proper to the terminal in question. The location estimator 30 stores the information contained in the location estimation information signal received from the target terminals 10 and the reference terminals 20 to be used for estimating the location of the target terminal 10 in question on the basis of the stored information.

The operation for location estimation in the instant alternative embodiment is similar to that of the embodiment of FIG. 1. However, as for the information used for location estimation, the difference resides in that the information stored is selected on the basis of the information pertinent to movement of the target terminal 10, the location of which is to be estimated, in order to find out its second estimated location. For example, if the target terminal 10 has not moved, the information transmitted or received in the past is exploited. If the target terminal 10 has moved, the received information is weighted, while the weight on the information transmitted or received in the past is lowered.

It is also possible to select the stored information, responsive to the time elapsed as from a receipt of the location estimation information signal, in order to find out the second estimated location of the target terminal 10. For example, the received information is weighted and the weight in the information is varied responsive to the time elapsed as from time of receipt of the information.

By employing the information on terminal movement, the data transmitted in the past between the target terminals 10 may be used for location estimation in dependence upon movement of the target terminal 10 with the result that location estimation may be improved in accuracy. Moreover, since the past information is used, the interval of periodic transmission of location estimation signals may be made longer to enable the communication traffic for location estimation to be decreased further. Also, it becomes possible to use the past information to thereby obtain the averaged information, thus enabling the effect of fading to be reduced, and attaining highly accurate location estimation.

The foregoing description has been made of a case where the movement detection function is incorporated into the target terminal 10 in addition to the functions of the target terminal 10 in accordance with the embodiment of FIG. 1. This is also applicable to the alternative embodiment of FIG. 5 with the movement detection function incorporated into the target terminal 10 of that alternative embodiment. In the latter case also, the movement detection function incorporated into the target terminal 10 renders an improvement on its location estimation accuracy.

In the above-described three embodiments, the system is structured in which location estimation uses a received power value of the wireless signal as the information necessary for location estimation. However, the present invention is not limited to using the received power value of the wireless signal as the information necessary for location estimation. Information necessary for location estimation may alternatively be of a signal propagation delay time, signal-incoming direction, or difference in propagation delay between plural signals of different wavelengths, or other information so far as signals can be measured by the target or reference terminal 10 or 20.

The entire disclosure of Japanese patent application No. 2006-36608 filed on Feb. 14, 2006, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A system for location estimation, comprising:
   a plurality of target terminals for transmitting and receiving wireless signals;
   a plurality of reference terminals each arranged at a known location for transmitting and receiving wireless signals; and
   a location estimator receiving the wireless signals transmitted by said plurality of target terminals and said plurality of reference terminals, said location estimator acquiring first information necessary for location estimation from the wireless signals received from said plurality of reference terminals, and finding out a first estimated location for each of said plurality of target terminals on a basis of the acquired first information and the locations of said plurality of reference terminals, and
   acquiring second information necessary for location estimation from the wireless signals received from said plurality of target terminals, selecting each of the plurality of target terminals, and updating the first estimated location for the selected target terminal on the basis of the first information and the second information, the first estimated location of ones of said plurality of target terminals other than the selected target terminal, and the locations of said plurality of reference terminals to thereby produce a second estimated location for each of the plurality of target terminals, wherein
   each of said plurality of target terminals transmits a location estimation request signal including third information of an identification code allotted to the target terminal as a transmitting terminal code;
   each of said plurality of target terminals, when having received the location estimation request signal transmitted from other ones of said plurality of target terminals, measuring the second information from the received location estimation request signal, and transmitting a location estimation information signal including the measured second information, the third information included in the received location estimation request signal and information of an identification code allotted to the target terminal as a relay terminal code;
   each of said plurality of reference terminals receives the location estimation request signal transmitted from said plurality of target terminals, measures the second information from the received location estimation request signal, and transmits a location estimation information signal including the second information measured, information of the transmitting terminal code included in the received location estimation request signal and information including an identification code allotted to the reference terminal as a relay terminal code;
   said location estimator receives the location estimation information signals transmitted from said plurality of target terminals and said plurality of reference terminals, and finding out the first estimated location of said plurality of target terminals on the basis of the first information included in one of the received location estimation information signals which is of the reference terminal specified by the relay terminal code, and the locations of said plurality of reference terminals; and
   said location estimator updates the first estimated locations of said plurality of target terminals on the basis of the first information and the second information included in the location estimation information signals received from said plurality of target terminals and said plurality of reference terminals, the first estimated locations of said target terminals other than said target terminal of which the location is to be estimated, and the locations of said plurality of reference terminals to thereby produce the second estimated location.

2. The system in accordance with claim 1, wherein, after producing the second estimated location of each of said plurality of target terminals, said location estimator uses the second estimated locations as the first estimated locations to update again the first estimated locations of each of said plurality of target terminals to thereby produce an updated second estimated location for each of the plurality of target terminals.

3. The system in accordance with claim 1, wherein said plurality of target terminals or said plurality of reference terminals measure a received power of the wireless signal and have information on the measured power as the second or first information respectively.

4. The system in accordance with claim 1, wherein each of said plurality of target terminals has a movement detector for detecting movement thereof, and including information on the movement of said target terminal into the location estimation information signal; and said location estimator stores, each time the location estimation information signal is received, information contained in the location estimation information signal, selects the stored information on the basis of the information on the movement of said target terminal, and uses the selected information to update the first estimated location of said target terminal.

5. The system in accordance with claim 4, wherein said location estimator selects the stored information responsive to a time elapsed from receiving the location estimation information signal.

6. The system in accordance with claim 1, wherein said location estimator selects a location between the first and second estimated locations to thereby update the first estimated location, if a distance between the first and second estimated locations of said target terminal is not less than a predetermined value.

7. The system in accordance with claim 1, wherein, after producing the second estimated location of each of said plurality of target terminals, said location estimator uses the second estimated locations as the first estimated locations to update again the first estimated locations of each of said plurality of target terminals to thereby produce an updated second estimated location for each of the plurality of target terminals, and repeats the updating until results of the updated second estimation location converge for each of the plurality of target terminals.

* * * * *